(12) United States Patent
Kawaguchi

(10) Patent No.: US 11,307,944 B2
(45) Date of Patent: Apr. 19, 2022

(54) AUTOMATED FAILOVER FOR ASYNCHRONOUS REMOTE COPY

(71) Applicant: Hitachi, Ltd., Tokyo (JP)

(72) Inventor: Tomohiro Kawaguchi, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 4 days.

(21) Appl. No.: 16/892,636

(22) Filed: Jun. 4, 2020

(65) Prior Publication Data
US 2021/0382799 A1 Dec. 9, 2021

(51) Int. Cl.
| | |
|---|---|
| *G06F 11/20* | (2006.01) |
| *G06F 11/14* | (2006.01) |
| *G06F 16/17* | (2019.01) |
| *G06F 11/07* | (2006.01) |
| *G06F 16/18* | (2019.01) |

(52) U.S. Cl.
CPC ...... *G06F 11/2023* (2013.01); *G06F 11/0772* (2013.01); *G06F 11/1461* (2013.01); *G06F 11/1464* (2013.01); *G06F 11/1466* (2013.01); *G06F 11/1469* (2013.01); *G06F 16/1734* (2019.01); *G06F 16/1815* (2019.01)

(58) Field of Classification Search
CPC ............ G06F 11/2023; G06F 11/1466; G06F 11/1469; G06F 16/1734; G06F 16/1815; G06F 11/1464; G06F 11/1461; G06F 11/0772
USPC ......................................................... 711/162
See application file for complete search history.

(56) References Cited

U.S. PATENT DOCUMENTS

| | | | |
|---|---|---|---|
| 7,152,079 B2 | 12/2006 | Hirakawa et al. | |
| 8,943,286 B1 | 1/2015 | Watanabe et al. | |
| 10,114,691 B2 | 10/2018 | Johri et al. | |
| 10,223,210 B2 * | 3/2019 | Brown | G06F 11/2064 |
| 2016/0259559 A1 * | 9/2016 | Jin | G06F 3/061 |

\* cited by examiner

*Primary Examiner* — Yair Leibovich
(74) *Attorney, Agent, or Firm* — Procopio, Cory, Hargreaves & Savitch LLP

(57) ABSTRACT

Example implementations described herein are directed to automated failover and assuring RTO (Recovery Time Objective) assurance, and RPO (Recovery Point Objective) on asynchronous remote copy feature of storage. By using markers that are cyclically stored to the journal volume, the storage device can thereby determine an accurate communication loss period.

14 Claims, 18 Drawing Sheets

| Volume# 101-1-1 | Attribution 101-1-2 | Pair Storage# 101-1-3 | Pair Volume# 101-1-4 | Journal Volume# 101-1-5 | Quorum ID 101-1-6 | Quorum LBA 101-1-7 | Pair State 101-1-8 |
|---|---|---|---|---|---|---|---|
| 1 | Primary | 2 | 3 | 2 | 943...ed6 | 0 | PAIR |
| 2 | Journal | - | - | - | - | - | - |
| 3 | Primary | 2 | 5 | 2 | 943...ed6 | 2 | PAIR |
| 4 | Primary | 2 | 4 | 2 | 943...ed6 | 1 | COPY |
| 5 | - | - | - | - | - | 0 | SMPL |

Volume/Pair Management Table 101-1a

| Journal Volume# 101-2a-1 | Last Issued Seq.# 101-2a-2 | Last Processed Seq# 101-2a-3 | Time of Last Processed Marker 101-2a-4 |
|---|---|---|---|
| 2 | 123456 | 123432 | 1581388656151 |

Journal Management Table 101-2a

Storage Device 100a

| Volume# 101-1-1 | Attribution 101-1-2 | Pair Storage# 101-1-3 | Pair Volume# 101-1-4 | Journal Volume# 101-1-5 | Quorum ID 101-1-6 | Quorum LBA 101-1-7 | Pair State 101-1-8 |
|---|---|---|---|---|---|---|---|
| 1 | Journal | - | - | - | - | - | - |
| 2 | - | - | - | - | - | - | SMPL |
| 3 | Secondary | 1 | 1 | 1 | 943...ed6 | 0 | PAIR |
| 4 | Secondary | 1 | 4 | 1 | 943...ed6 | 1 | COPY |
| 5 | Secondary | 1 | 3 | 1 | 943...ed6 | 2 | PAIR |

Volume/Pair Management Table 101-1b

| Journal Volume# 101-2b-1 | Last Received Seq.# 101-2b-2 | Time of Last Received Marker 101-2b-3 |
|---|---|---|
| 1 | 1 | 1581388653357 |

Journal Management Table 101-2b

Storage Device 100b

| Volume# 101-1-1 | Attribution 101-1-2 | Pair Storage# 101-1-3 | Pair Volume# 101-1-4 | Journal Volume# 101-1-5 | Quorum ID 101-1-6 | Quorum LBA 101-1-7 | Pair State 101-1-8 |
|---|---|---|---|---|---|---|---|
| 1 | Primary | 2 | 3 | 2 | 943...ed6 | 0 | PAIR |
| 2 | Journal | - | - | - | - | - | - |
| 3 | Primary | 2 | 5 | 2 | 943...ed6 | 2 | PAIR |
| 4 | Primary | 2 | 4 | 2 | 943...ed6 | 1 | COPY |
| 5 | - | - | - | - | - | 0 | SMPL |

Volume/Pair Management Table 101-1a

| Journal Volume# 101-2a-1 | Last Issued Seq.# 101-2a-2 | Last Processed Seq# 101-2a-3 | Time of Last Processed Marker 101-2a-4 |
|---|---|---|---|
| 2 | 123456 | 123432 | 1581388656151 |

Journal Management Table 101-2a

Storage Device 100a

| Volume# 101-1-1 | Attribution 101-1-2 | Pair Storage# 101-1-3 | Pair Volume# 101-1-4 | Journal Volume# 101-1-5 | Quorum ID 101-1-6 | Quorum LBA 101-1-7 | Pair State 101-1-8 |
|---|---|---|---|---|---|---|---|
| 1 | Journal | - | - | - | - | - | - |
| 2 | - | - | - | - | - | - | SMPL |
| 3 | Secondary | 1 | 1 | 1 | 943...ed6 | 0 | PAIR |
| 4 | Secondary | 1 | 4 | 1 | 943...ed6 | 1 | COPY |
| 5 | Secondary | 1 | 3 | 1 | 943...ed6 | 2 | PAIR |

Volume/Pair Management Table 101-1b

| Journal Volume# 101-2b-1 | Last Received Seq.# 101-2b-2 | Time of Last Received Marker 101-2b-3 |
|---|---|---|
| 1 | 1 | 1581388653357 |

Journal Management Table 101-2b

Storage Device 100b

FIG. 4

$\Delta Tc_{/p}$ : Marker checking cycle on the primary     F101

$\Delta Tc_{/s}$ : Marker checking cycle on the secondary     F102

$\Delta T_Q$ : Alive information registration cycle     F103

$\Delta Tc_{/s} \leq 2\text{x } \Delta Tc_{/p}$     F104

$\text{RTO} \leq 2\text{x } \Delta Tc_{/s} + 2\text{x } \Delta T_Q$     F105

$\text{RPO} \leq 2\text{x } \max\left(\Delta Tc_{/p}, \Delta Tc_{/s}\right) + 2\text{x } \Delta T_Q$     F106

FIG. 14

AUTOMATED FAILOVER FOR ASYNCHRONOUS REMOTE COPY

BACKGROUND

Field

The present disclosure is generally directed to storage systems, and more specifically, to facilitating automated failover for asynchronous remote copy.

Related Art

In related art storage systems, important data is stored redundantly between remote locations to avoid loss by disaster such as fire, earthquake and/or terrorism. The storage devices provide feature known as "storage remote copy" which copies data between paired storage volumes and maintains data consistency when a host computer issues a data write operation.

Such storage remote copy operations are categorized into synchronous storage remote copy and asynchronous remote copy. If the distance between the storage locations is short, a synchronous copy is often selected because it allows for no data loss and immediate fail-over on disaster.

SUMMARY

However, in implementations involving short distance storage remote copy, it can be difficult to protect data against wide-area disasters such as large earthquakes and hurricanes. The farther the distance between the systems, the more resilient the system becomes to such disaster. However, such implementations also result in longer communication delays for data transfer. For example, there can be one millisecond of delay for every 100 kilometers of distance.

To address such limitations in the related art, example implementations are directed to asynchronous storage remote copy for especially important data, application, or business.

Aspects of the present disclosure involve a method for managing an asynchronous copy pair between a first storage system managing a primary volume and a second storage system managing a secondary volume, the primary and the secondary volume configured to be an asynchronous copy pair configured to manage copy operations through a primary journal and a secondary journal, the method involving storing, at the first storage system, a marker indicative of a current time to the primary journal; determining, at the first storage system, if no access has occurred from the second storage system to the primary journal for a first threshold period of time; for the determining at the first storage system indicative of no access from the second storage system for more than the first threshold period of time, suspending the time operations between the primary volume and the secondary volume; determining, at the second storage system, if no marker is provided to the secondary journal for a second threshold period of time; for the determining at the second storage system indicative of no marker being provided for more than the second threshold period of time, suspending copy operations for the asynchronous copy pair.

Aspects of the present disclosure involve a non-transitory computer readable medium, storing instructions for managing an asynchronous copy pair between a first storage system managing a primary volume and a second storage system managing a secondary volume, the primary and the secondary volume configured to be an asynchronous copy pair configured to manage copy operations through a primary journal and a secondary journal, the instructions involving storing, at the first storage system, a marker indicative of a current time to the primary journal; determining, at the first storage system, if no access has occurred from the second storage system to the primary journal for a first threshold period of time; for the determining at the first storage system indicative of no access from the second storage system for more than the first threshold period of time, suspending the time operations between the primary volume and the secondary volume; determining, at the second storage system, if no marker is provided to the secondary journal for a second threshold period of time; for the determining at the second storage system indicative of no marker being provided for more than the second threshold period of time, suspending copy operations for the asynchronous copy pair.

Aspects of the present disclosure involve a system for managing an asynchronous copy pair between a first storage system managing a primary volume and a second storage system managing a secondary volume, the primary and the secondary volume configured to be an asynchronous copy pair configured to manage copy operations through a primary journal and a secondary journal, the system involving means for storing, at the first storage system, a marker indicative of a current time to the primary journal; means for determining, at the first storage system, if no access has occurred from the second storage system to the primary journal for a first threshold period of time; for the determining at the first storage system indicative of no access from the second storage system for more than the first threshold period of time, means for suspending the time operations between the primary volume and the secondary volume; means for determining, at the second storage system, if no marker is provided to the secondary journal for a second threshold period of time; for the determining at the second storage system indicative of no marker being provided for more than the second threshold period of time, means for suspending copy operations for the asynchronous copy pair.

BRIEF DESCRIPTION OF DRAWINGS

FIG. 4 illustrates examples of Volume/Pair Management Table, in accordance with an example implementation.

FIG. 14 illustrates example parameters and their conditional expression of each cyclic time, in accordance with an example implementation.

DETAILED DESCRIPTION

Figure 1:
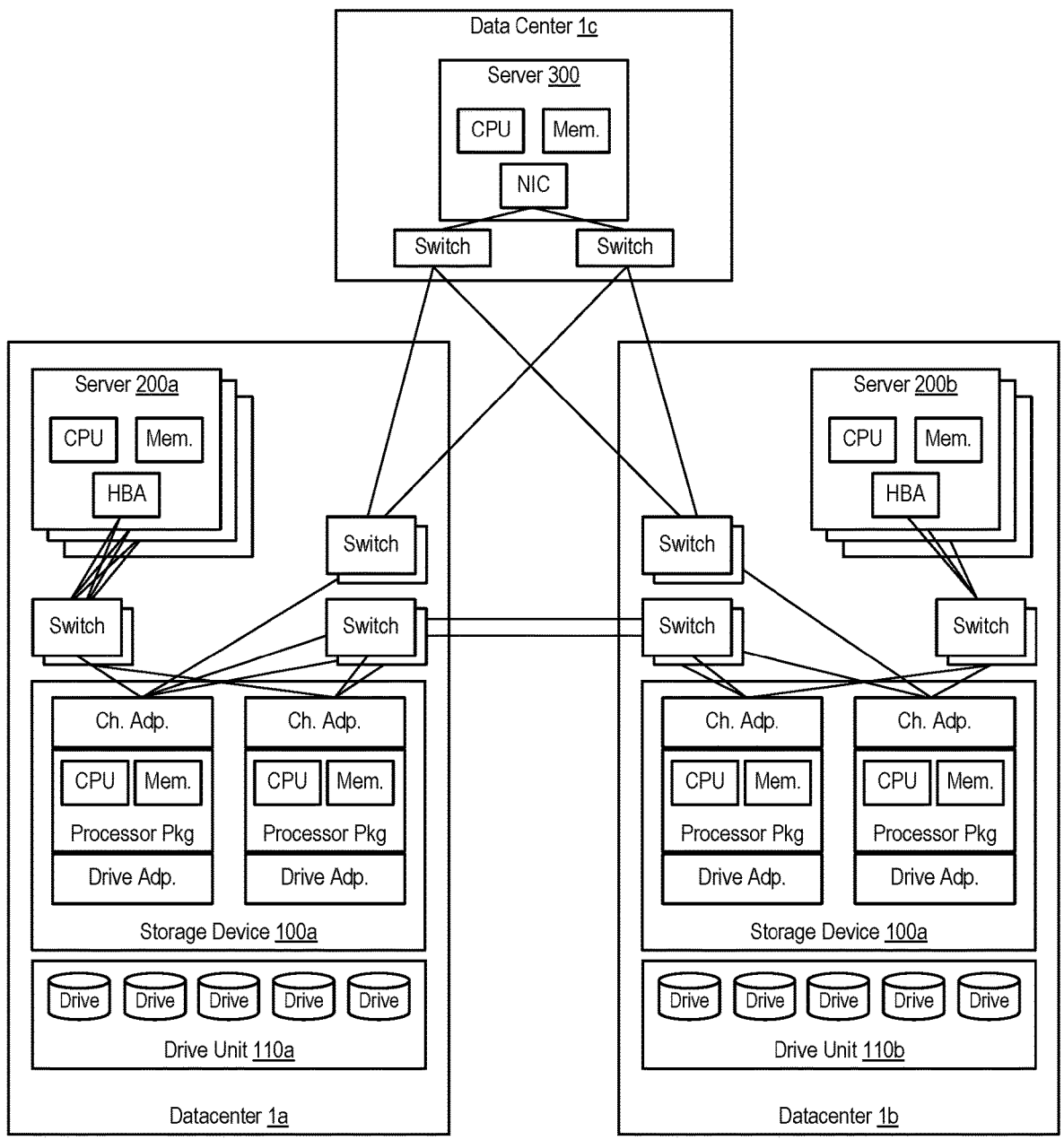
FIG. 1 illustrates a physical configuration of high available system using asynchronous storage remote copy, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to fail-over automation, RTO (Recovery Time Objective) assurance, and RPO (Recovery Point Objective) assurance for asynchronous storage remote copy.

In an example implementation, there are two storage devices configured to conduct asynchronous remote copy configuration. Such example implementations involve a primary storage and a secondary storage configured to provide one volume each to establish volume pair. The primary storage device and the secondary storage device also provide a journal volume each. The primary storage device stores updated data to the journal volume, wherein the secondary storage device migrates data from the journal volume of the primary storage device to the journal volume of the secondary storage device. The secondary storage device updates data of the volume using update date in the journal volume.

In an example implementation, a quorum device is utilized to judge the failure point. The primary and the secondary storage device are connected to a quorum device. The primary and the secondary storage device are set according to alive information to the device. If the primary storage device cannot access the secondary storage device and there is no update of the alive information of the secondary storage device, the primary storage device determines that the second storage device has failed. If the secondary storage device cannot access the primary storage device and there is no update of alive information of the primary storage device, the secondary storage device determines that the second storage device has failed. If the secondary storage device cannot access the primary storage device but there is update of alive information of the primary storage device, the secondary storage device determines that the network between the primary and the second storage device has failed.

Example implementations can also involve automated pair suspension. In such an example implementation, the primary storage device set a marker cyclically into the journal volume and checks the oldest marker of the uncopied ones periodically. The primary storage device suspends the pair if the term between current time and the time which the oldest marker was set exceeds a threshold, and there is no update of alive information of the secondary storage in the quorum device.

Example implementations can also involve an automated fail-over with RTO/RPO assurance. In such an example implementation, the secondary storage device checks the newest marker in that journal volume periodically. The secondary storage device takes over the pair if the term between current time and the time which the newest marker was set exceeds a threshold, and there is no update of alive information of the primary storage in the quorum device.

A first example implementation is described as follows.

FIG. 1 illustrates a physical configuration of high available system using asynchronous storage remote copy, in accordance with an example implementation. In an example implementation as illustrated in FIG. 1, there are three data centers: Data Center 1a, Data Center 1b, and Data Center 1c.

Data Center 1a includes a storage device as illustrated at Storage Device 100a. Storage Device 100a includes Channel Adapter to connect to servers, Drive Adapter to connect to Drive Unit 110a, CPU (Central Processing Unit) to control the device, and memory to store cache data and control information. Drive Unit 110a stores drives. Storage servers include Server 200a which includes CPU, Memory and HBA (Host Bus Adapter). Network switches connect Server 200a and Storage Device 100a.

Data Center 1b includes a storage device such as Storage Device 100b. Storage Device 100b includes Channel Adapter to connect to servers, Drive Adapter to connect to Drive Unit 110b, CPU to control the device and memory to store cache data and control information. Drive Unit 110b stores drives. Storage servers include Server 200b which includes CPU, memory and HBA (Host Bus Adapter). Network switches connect Server 200b and Storage Device 100b.

Data Center 1c includes a server such as Server 300. Server 300 includes CPU, memory and NIC (Network Interface Card). Storage Device 100a, Storage Device 100b, and Server 300 are connected by network switches.

Figure 2:
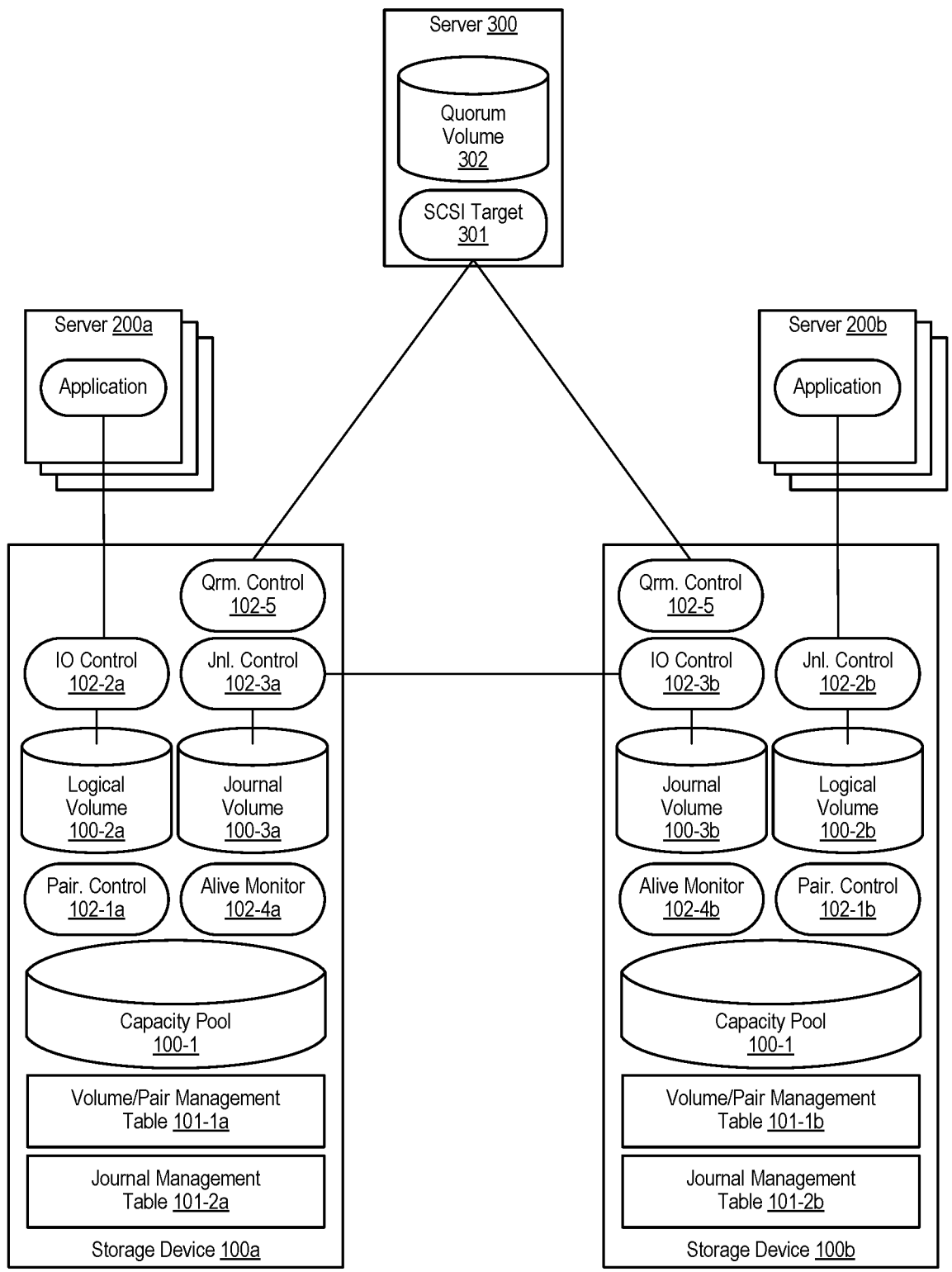
FIG. 2 illustrates a logical configuration of high available system using asynchronous storage remote copy, in accordance with an example implementation.

FIG. 2 illustrates a logical configuration of high available system using asynchronous storage remote copy, in accordance with an example implementation. Each control program is executed in the CPU of a device. Each management table is stored in memory and used by the CPU of a device. Each logical object is provided by CPU using the control program and the management table.

Storage Device 100a includes logical objects such as logical Volume 100-2a which receives I/O (input/output) command from Server 200a. Server 200a publishes CDB (Command Descriptor Block) for the I/O which includes LBA (Logical Block Address) to the volume. When receiving read I/O command, the storage device transfers data stored in the drives or the memory. After receiving write I/O command, the storage device stores data to the memory or drives. This volume is a primary volume of a remote copy pair formed with Logical Volume 100-2b as described below.

Journal Volume 100-3a is provided so that the storage device stores data in update (write I/O receiving) order on Logical Volume 100-2. The data for each write I/O is called "journal data". Capacity Pool 100-1 provides capacity to store data or journal data for logical volumes and journal volumes.

Control programs include the following. Pair Management Control 102-1a which controls pair state which changes on events such as pair operation and failure. Input/Output (IO, also referred herein as I/O) Control 102-2a controls IO behavior of Logical Volume 100-2a according to that pair states, such as prohibition and storing to journal volume. Journal Control 102-3a controls access for journal data required from the paired storage device. Alive Monitor 102-4a provides Alive/death monitoring for the paired storage using the journal and quorum. Quorum Control 102-5 accesses control to record and checks alive information for the quorum device.

Management tables include the following. Volume/Pair Management Table 101-1a stores volume attribution, ID (identifier) of paired volume, pair state, ID of using journal volume, and information of quorum to manage logical volumes. Journal Management Table 101-2a stores journal information to manage journal volumes and remote copy process.

Storage Device 100b includes logical objects as follows. Logical Volume 100-2b receives I/O (input/output) command from Server 200a. Server 200b publishes COB (Command Descriptor Block) for the I/O which includes LBA (Logical Block Address) to the volume. When receiving a read I/O command, the storage device transfers data stored in the drives or the memory. After receiving a write I/O command, the storage device stores data to the memory or drives. This volume is a secondary volume of a remote copy pair formed with Logical Volume 100-2a described above. Journal Volume 100-3b is used such that the storage device copies data from Journal Volume 100-3a which is stored written data to Logical Volume 100-2a in update (write I/O receiving) order. Journal Volume 100-3b provides capacity to store data or journal data for logical volumes and journal volumes.

Storage Device 100b can involve control programs which can include the following. Pair Management Control 102-1b controls pair state which changes on events such as pair operation and failure. IO Control 102-2a controls IO behavior of Logical Volume 100-2b according to that pair states, such as prohibition. Journal Control 102-3a is configured to copy journal data from Journal Volume 100-3a and promote that journal data to Logical Volume 100-2B.

Alive Monitor 102-4a is configured to conduct alive/death monitoring for the paired storage by using the journal and the quorum.

Quorum Control 102-5 is configured to manage access control to record and check the alive information for the quorum device.

The management tables can involve volume/pair management table 101-1b and journal management table 101-2a. Volume/Pair Management Table 101-1b stores volume attribution, ID of paired volume, pair state, ID of using journal volume, and information of the quorum to manage logical volumes. Journal Management Table 101-2a stores journal information to manage journal volumes and remote copy process.

Figure 3:
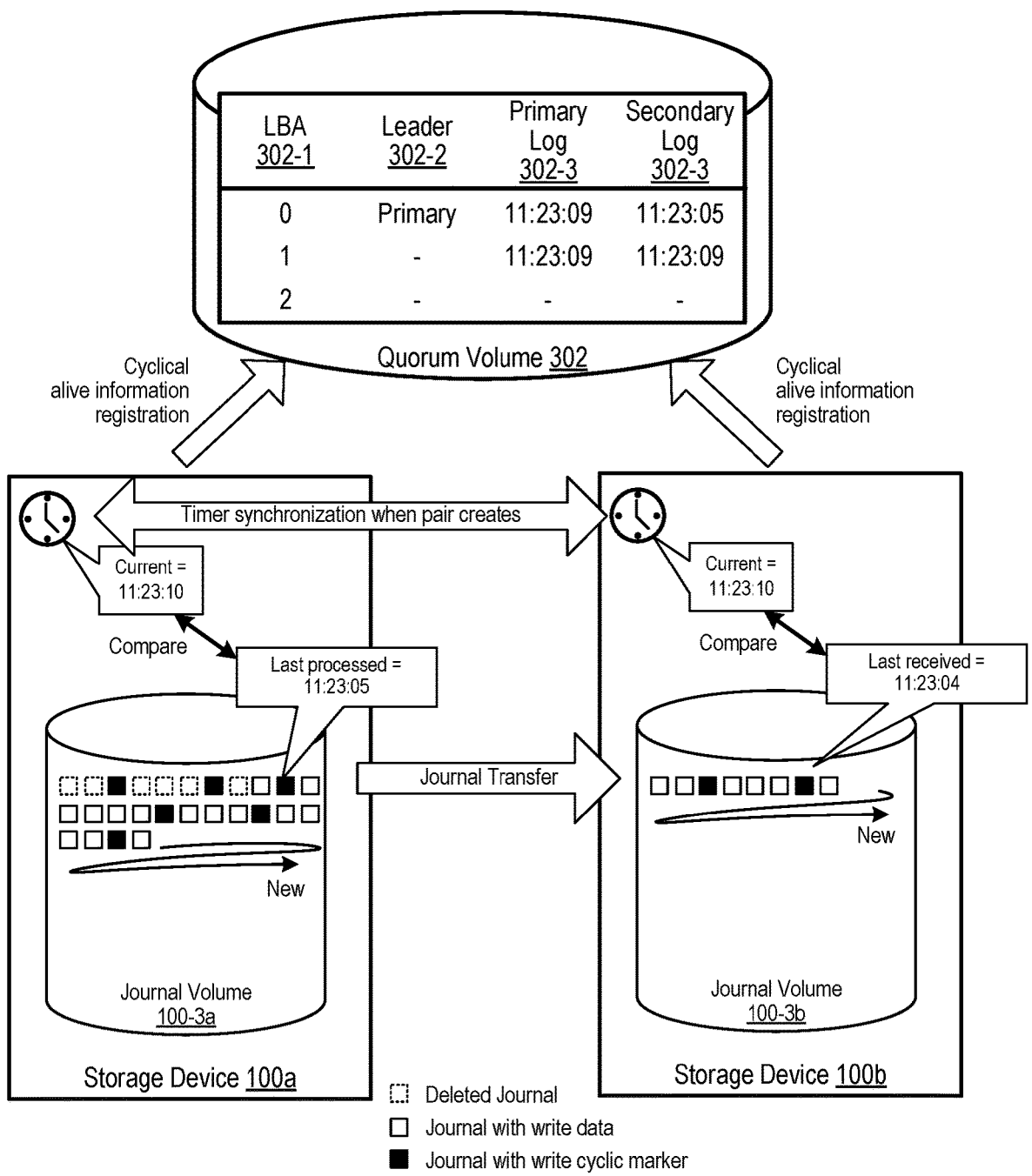
FIG. 3 illustrates an overview of the system and management information stored in Quorum Volume, in accordance with an example implementation.

FIG. 3 illustrates an overview of the system and management information stored in Quorum Volume 302, in accordance with an example implementation. Quorum Volume 302 supports "Atomic Test and Set" command such as "COMPARE AND WRITE: of SCSI command. The command facilitates atomically updating of data stored in same address even if an update collision by two devices occurs at the same time.

Quorum Volume 302 stores Logical Block Address (LBA) 302-1, Leader Information 302-2, Primary Log 302-3, and Secondary Log 303-4. LBA 302-1 is a logical block address that provides a unique ID in the volume. Leader Information 302-2 indicates information identifying that device is stored whether either device becomes the leader. "(null)" is stored if there is no need to select a leader. Primary Log 302-3 includes the information that is updated by a primary device and stores the last time when the device assessed to the quorum volume. Secondary Log 302-4 includes the information is updated by a secondary device and stores the last time when the device accessed to the quorum volume.

Storage devices 100a and 100b have a clock time are almost the same. The error (difference) is small enough that it can be ignored. This can be accomplished by using GPS (Global Positioning System) or NTP (Network Time Protocol).

When a pair is suspended by Storage Device 100a, the Journal Volume 100-3a stores journal data by duplication of primary volumes in Storage Device 100a. Storage Device 100a stores markers cyclically into the Journal Volume 100-3a. If there is no journal data transfer request from the secondary for a certain period, Storage Device 100a confirms and becomes a leader using Quorum Volume 302. Elapsed time is calculated by difference between current time and time stored in the newest (already-migrated) marker.

FIG. 4 illustrates examples of Volume/Pair Management Table 101-1a and 101-1b, in accordance with an example implementation. The both have the same members. Table 101-1a is stored in Storage Device 100a, and table 101-1b is in Storage Device 100b. Volume Number 101-1-1 include ID of volume in the storage device.

Volume Attribution 101-1-2 stores the attribution of the volume (e.g., Primary, Secondary, Journal, or—(null) is stored). "Primary" indicates that the volume is the primary volume of the remote copy. "Secondary" indicates that the volume is the secondary volume of the remote copy. "Journal" indicates that the volume is the journal volume of the remote copy. "—(null)" indicates that the volume is not used for the remote copy.

Pair Storage Number 101-1-3 indicates the ID of the storage device which a paired volume of the volume is located. Pair Volume Number 101-1-4 is the ID of a volume in that storage device which the volume paired. Journal Volume Number 101-1-5 is the ID of a journal volume which the volume uses. Quorum ID 101-1-6 is the ID of the quorum which the storage device and that paired storage device recognize. Quorum LBA 101-1-7 indicates the logical block address in the quorum device to which the storage and that paired storage device store the alive information.

Pair State 101-1-8 is the pair state of the volume, wherein states such as SMPL, COPYPND, COPY, PAIR-NQ, PSUS, SSUS, PSWS, SSWS, PSUE, (null) is stored to the field. SMPL state indicates that the volume is in progress to establish a pair. COPYPND state indicates that the volume is in progress to establish pair. COPY state indicates that the volume is in progress for initial copy between primary and secondary volume. PAIR-Q state indicates that the volume and that paired volume is synchronizing data if that primary volume data is updated, and both of those storage devices is reachable to that quorum device. PAIR-NQ state indicates that the volume and that paired volume is duplicating data if that primary volume data is updated, and either or both of these storage devices is not reachable to that quorum device. PSUS state indicates that the volume is a primary volume of that pair and accepts I/O of that data, and the duplication does not work. SSUS state indicates that the volume is a secondary volume of that pair and does not accept I/O of that data, and the duplication does not work. PSWS state indicates that the volume is a primary volume of that pair and does not accept I/O of that data, and the duplication does not work. SSWS state indicates that the volume is a secondary volume of that pair and accepts I/O of that data, and the duplication does not work. PSUE indicates that the volume has a pair but it does not accept I/O of that volume.—(null) indicates that the volume is not used for a logical volume.

Journal Management Table 101-2a manages information of a journal volume for primary volumes. Journal Volume Number 101-2a-1, 101-2b-1 indicates the ID of a journal volume. Last Issued Sequence Number 101-2a-2 indicates the ID of the last issued journal data. Each journal data has an ID which is issued incrementally. Thus, a lower ID means that is the journal data is older. Last Issued Sequence Number 101-2a-3 is the ID of the last deleted journal data. After the paired storage device read journal data, the storage device issues journal delete command to delete the already read journal data. Time of Last Processed Marker 101-2a-4 indicates the time stored in a marker which was last deleted by journal delete command.

Journal Management Table 101-2b includes the following information. Journal Volume Number 101-2b-1 ID of a journal volume. Last Received Sequence Number 101-2b-2 is the ID of the newest journal data received in the series. Time of Last Received Marker 101-2b-3 is the time stored in the newest marker.

Figure 5:
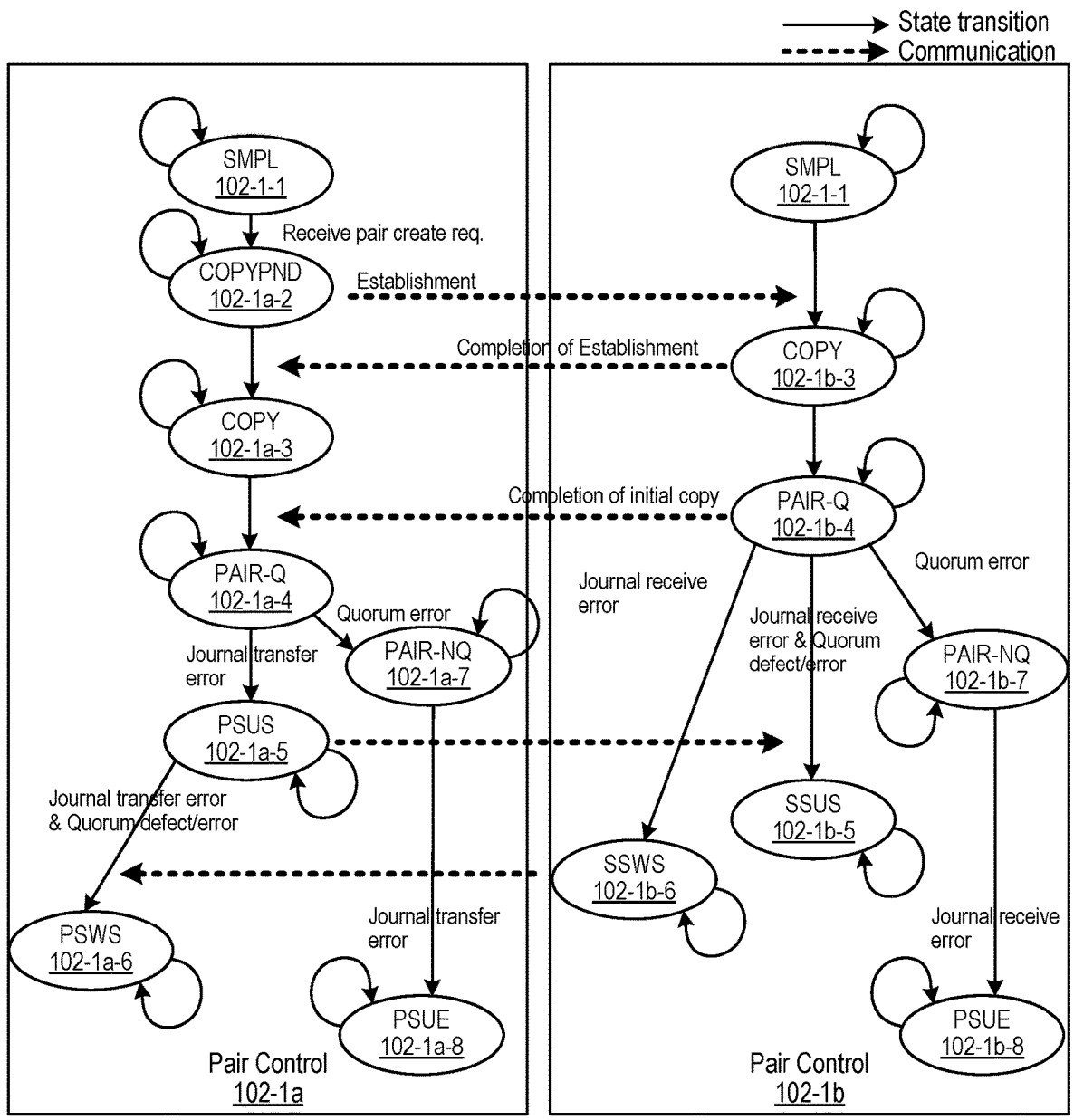
FIG. 5 illustrates the processes for Pair Control, in accordance with an example implementation.

FIG. 5 illustrates the processes for Pair Control 102-1a and Pair Control 102-1b, in accordance with an example implementation. The control is based on the state machine of the volume pair, such as the information stored in Pair State 101-1-8. In FIG. 5, the solid lines show state transition, and dashed lines show communication message when the transition occurs.

When a primary and secondary volume is not an established pair, the state of both are SMPL 102-1-1. When a storage device receives a command to establish a pair on SMPL 102-1-1 state, the state of the primary volume becomes COPYPND 102-1a-2 and then the storage device sends an "Establishment" message to that pair.

When a storage device receives the "Establishment" message on SMPL 102-1-1 state, the state of the secondary volume becomes COPY 102-1b-3, that storage returns a "Completion of Establishment" message, and the secondary volume starts to copy from that primary volume to the secondary volume.

When a storage device receives the "Completion of Establishment" on COPYEND 102-1a-2, the state of the primary volume becomes COPY 102-1a-3 and waits for the message "Completion of Initial Copy" from the pair.

When a storage device finishes the initial copy on COPY 102-1b-3 state, the state of the secondary volume becomes PAIR-Q 102-1b-4 and sends the "Completion of Initial Copy" message to that pair. When a storage device receives the "Completion of Initial Copy" message on COPY 102-1a-3 state, the state of the primary volume becomes PAIR-Q 102-1a-4.

When a storage device of the primary volume become unreachable for a quorum device or receives a "Quorum Failure" message from that pair on PAIR-Q 102-1a-4 state, the state becomes PAIR-NQ 102-1a-7 and sends a "Quorum Failure" message to the pair.

When a storage device of the secondary volume becomes unreachable for a quorum device or receives a "Quorum Failure" message from that pair on PAIR-Q 102-1b-4 state, the state becomes PAIR-NQ 102-1b-7 and sends a "Quorum Failure" message to the pair.

When a storage device of the primary volume on PAIR-Q 102-1a-4 becomes unreachable for the pair and gets a leader using the quorum device, the state becomes PSUS 102-1a-5. When a storage device of the secondary volume on PAIR-Q 102-1b-4 becomes unreachable for the pair and gets a leader using quorum device, the state becomes SSWS 102-1b-6.

When a storage device of the primary volume on PAIR-Q 102-1a-4 becomes unreachable for the pair and does not get a leader using the quorum device, the state becomes PSWS 102-1a-6.

When a storage device of the secondary volume on PAIR-Q 102-1b-4 becomes unreachable for the pair and does not get a leader using a quorum device, the state becomes SSUS 102-1b-5.

When a storage device of the primary volume on PAIR-NQ 102-1a-7 becomes unreachable for the pair, the state becomes PSUE 102-1a-8. When a storage device of the secondary volume on PAIR-NQ 102-1b-7 becomes unreachable for the pair, the state becomes PSUE 102-1b-8.

Figure 6:
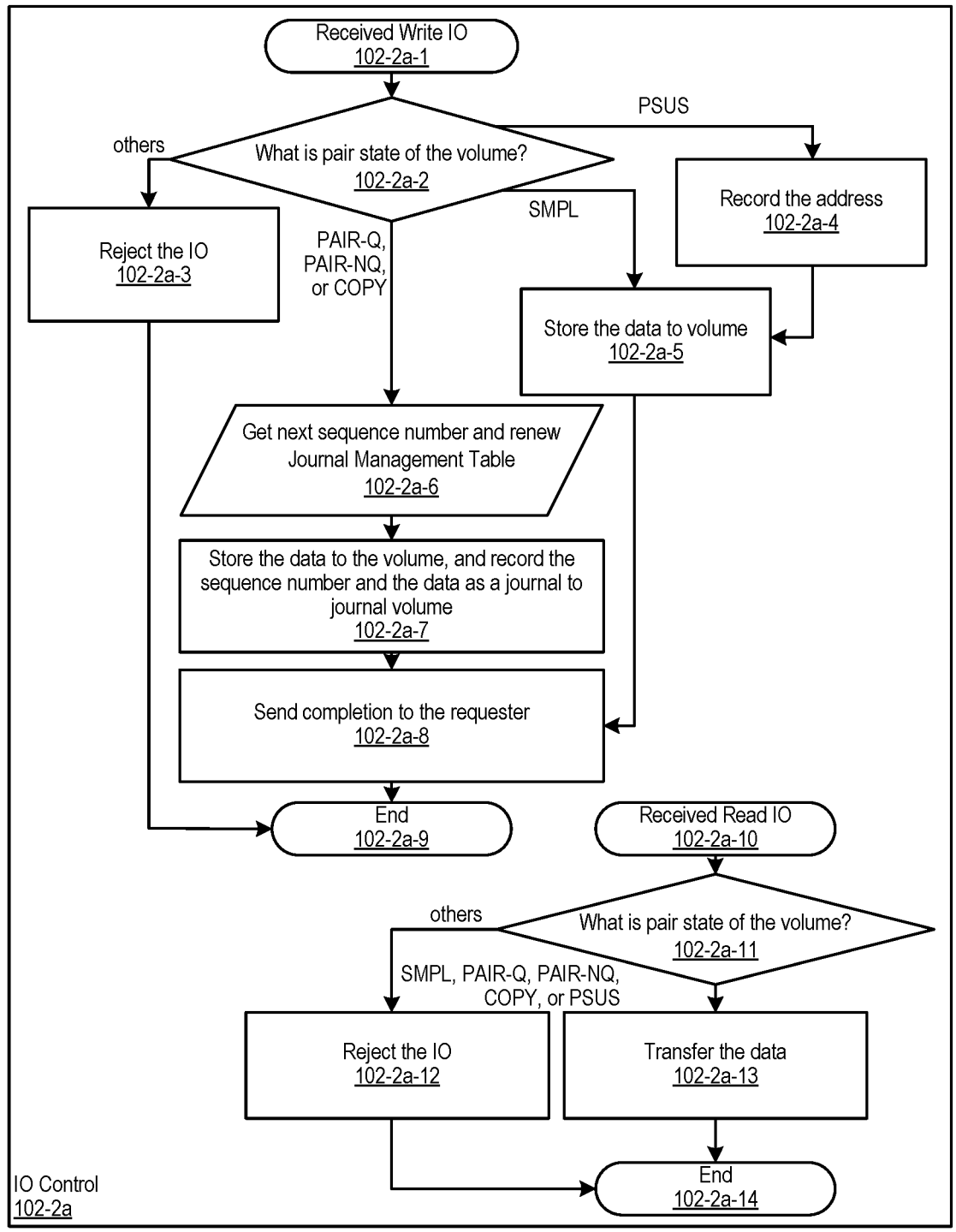
FIG. 6 illustrates an example flow for IO Control for a primary volume, in accordance with an example implementation.

FIG. 6 illustrates an example flow for IO Control 102-2a for a primary volume, in accordance with an example implementation.

Step 102-2a-1 starts when the primary volume receives a write I/O. The write I/O command includes the starting LBA (logical block address) and block length. Write 10 is allowed when the state is SMPL, PAIR-Q, PAIR-NQ, or PSUS. When the state is PAIR-Q, PAIR-NQ, or COPY, the primary volume records journal data.

In an example flow of the write I/O command, the pair state of the primary volume is considered at 102-2a-2. If the state is PSUS, then the flow proceeds to 102-2a-4 to record the address. If the state is SMPL, then the flow proceeds to 102-2a-5 to store the data associated with the write I/O to the volume. If the state is PAIR-Q, PAIR-NQ, or COPY, then the flow proceeds to 102-2a-6. If the state is any other state, then the flow proceeds to 102-2a-3 to reject the 10 and end the flow at 102-2a-9.

At 102-2a-6, the flow obtains the next sequence number and renews the Journal Management Table. At 102-2a-7, the flow stores the data to the volume, and records the sequence number and the data as a journal to journal volume. At 102-2a-8, the flow sends a completion to the requester.

Step 102-2a-10 starts when the primary volume receives a read I/O. The read I/O command includes the starting LBA (logical block address) and block length. Read 10 is allowed when that state is SMPL, PAIR-Q, PAIR-NQ, or PSUS.

At 102-2a-11, a determination is made as to the pair state of the volume. If the state is SMPL, PAIR-Q, PAIR-NQ, or PSUS, the flow proceeds to 102-2a-13 to transfer the data requested by the read I/O command. Otherwise, if the state is anything else, the flow proceeds to reject the 10 at 102-2a-12.

Figure 7:
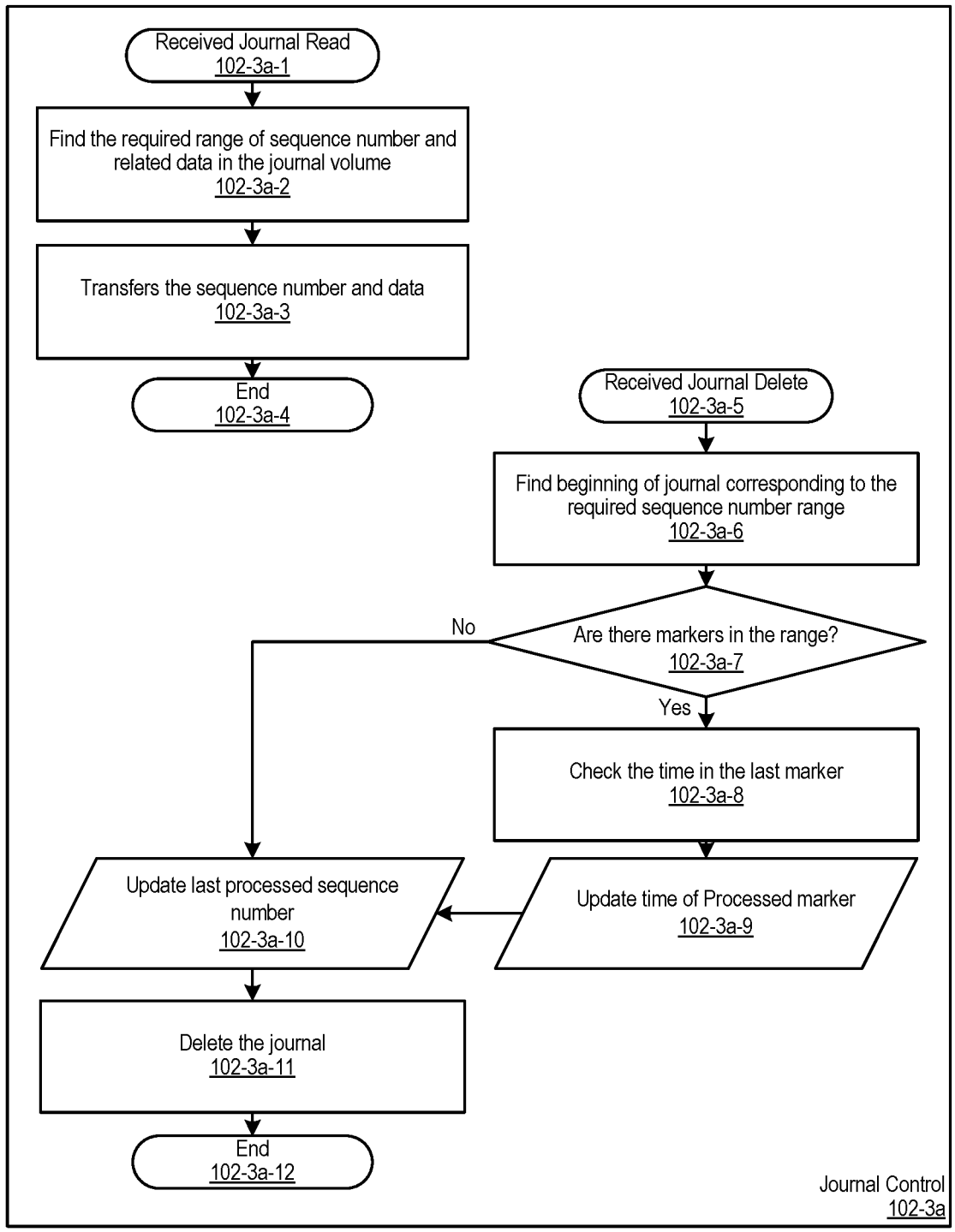
FIG. 7 illustrates an example flow for Journal Control for a journal volume of primary volumes, in accordance with an example implementation.

FIG. 7 illustrates an example flow for Journal Control 102-3a for a journal volume of primary volumes, in accordance with an example implementation. Step 102-3a-1 starts when the journal volume receives a read request. The read request command includes the starting journal ID and the size of the journal data. The program transfers one or more journal data and ID list of the associated journal data. At 102-3a-2, the flow finds the required range of sequence number and related data in the journal volume. At 102-3a-3, the flow transfers the sequence number and data. At 102-3a-4, the flow ends.

Step 102-3a-5 starts when the journal volume receives a delete request. The delete request command includes the ID list of the journal. The program deletes the journal data from the journal volume. At 102-3a-6, the flow finds the beginning of the journal corresponding to the required sequence number range. At 102-3a-7, a determination is made as to whether there are any markers in the sequence number range. If not (No), then the flow proceeds to 102-3a-10, otherwise (Yes), the flow proceeds to 102-3a-8. At 102-3a-8, the flow checks the time in the last marker. At 102-3a-9, the flow updates the time of the processed marker. At 102-3a-10, the flow updates the last processed sequence number. At 102-3a-11, the flow deletes the journal. At 102-3a-12, the flow ends.

Figure 8:
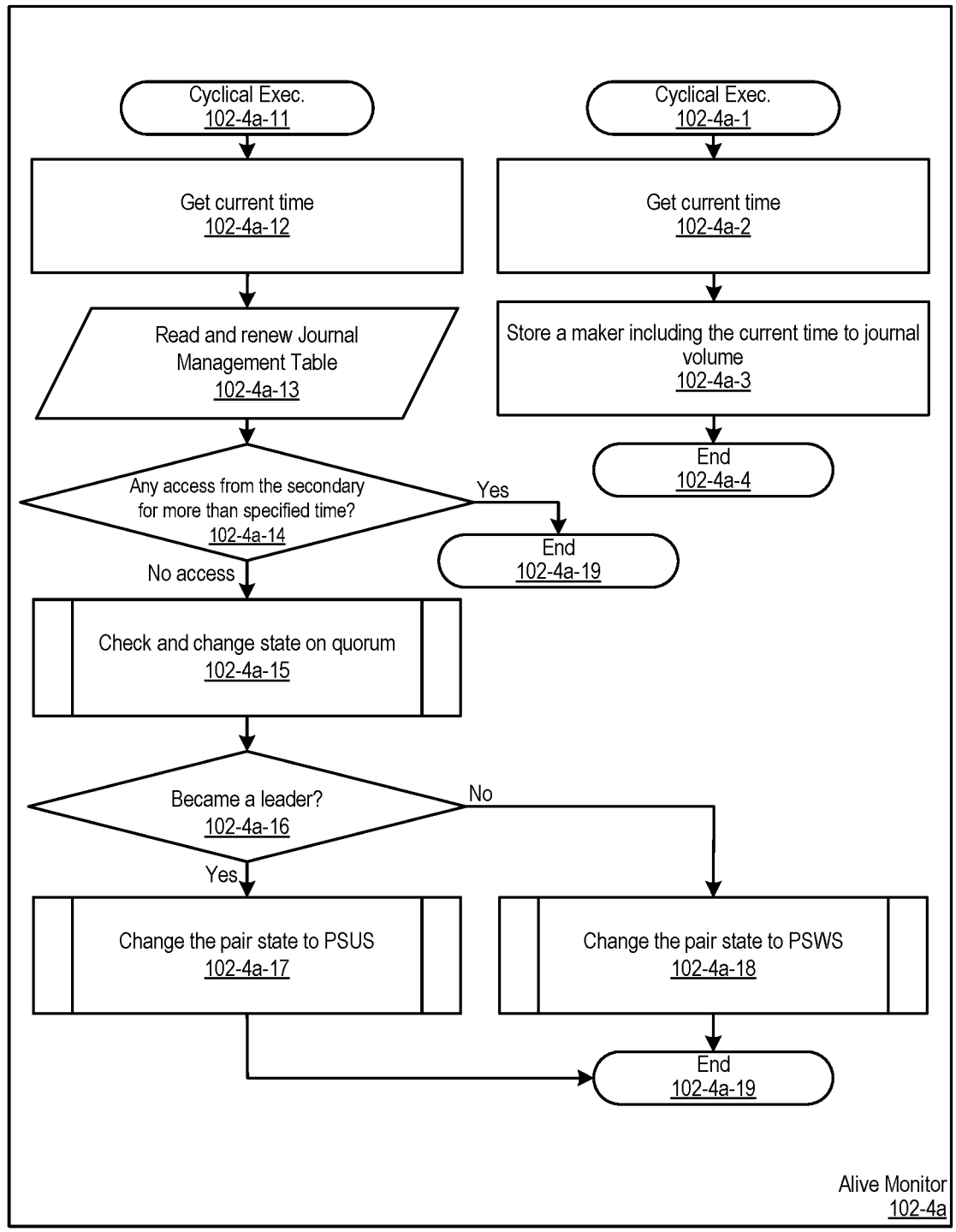
FIG. 8 illustrates an example flow of Alive Monitor for a storage device managing primary volumes, in accordance with an example implementation.

FIG. 8 illustrates an example flow of Alive Monitor 102-4a for a storage device managing primary volumes, in accordance with an example implementation. Step 102-4a-1 starts cyclically (for example, every second). The program checks reachability from or to paired storage using time of the last transferred marker. If the reachability is lost, it tries to get a leader with a quorum device. At 102-4a-2, the process obtains the current time. At 102-4a-3, the process stores a maker including the current time to the journal volume. At 102-4a-4, the process ends.

Step 102-4a-11 starts cyclically (for example, every five seconds). The cycle is longer than the cycle of Step 102-4a-1. The program sets a marker to a journal volume with time information. At 102-4a-12, the process obtains the current time. At 102-4a-13, the process reads and renews the Journal Management Table. At 102-4a-14, a determination is made as to whether there is any access from the secondary volume for more than a specified period of time. If so (Yes), then the process ends at 102-4a-19. Otherwise (No), the process proceeds to 102-4a-15 to check and change the state on the quorum.

At 102-4a-16, the process determines whether the storage device for the pair became the leader of the quorum device. If so (Yes), then the process proceeds to 102-4a-17 to change the pair state to PSUS. Otherwise (No), the process proceeds to 102-4a-18 to change the pair state to PSWS. At 102-4a-19, the process ends.

Figure 9:
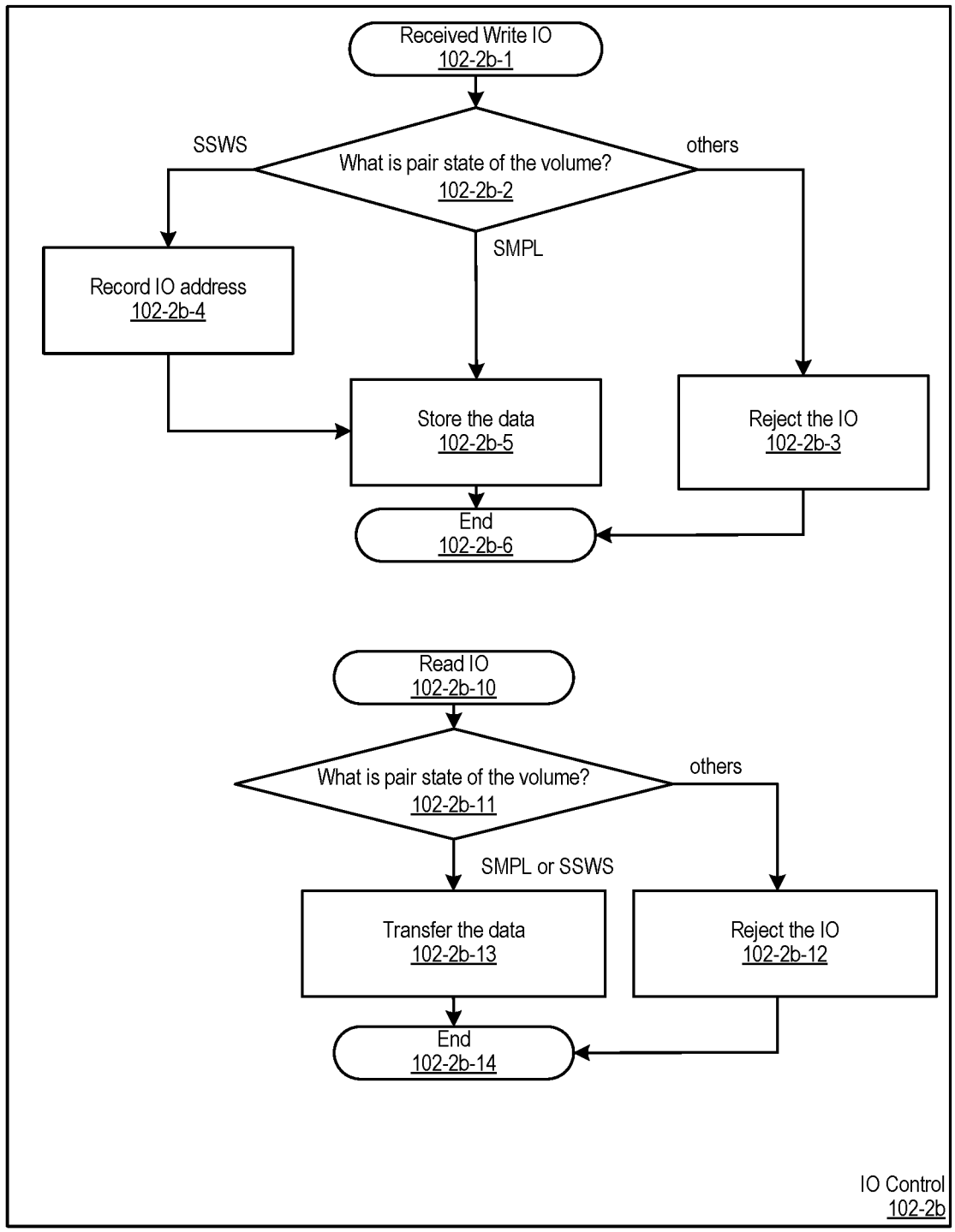
FIG. 9 illustrates an example flow of IO Control for a secondary volume, in accordance with an example implementation.

FIG. 9 illustrates an example flow of IO Control 102-2b for a secondary volume, in accordance with an example implementation. Step 102-2b-1 starts when the primary volume receives a write I/O. The write I/O command includes the starting LBA and block length. Write IO is allowed when that state is SMPL or SSWS. At 102-2b-2, the process determines the pair state of the volume. If the state is SSWS then the process proceeds to 102-2b-4 to record the IO address. If the state is SMPL, then the process proceeds to 102-2b-5 to store the data. If the state is anything else, then the process proceeds to 102-2b-3 to reject the 10. At 102-2b-6, the process ends.

Step 102-2b-10 starts when the primary volume receives read I/O. The read I/O command includes the starting LBA and block length. Read IO is allowed when that state is SMPL or SSWS. At 102-2b-11, the process determines the pair state of the volume. If the state is SMPL or SSWS, then the process proceeds to 102-2b-13 to transfer the data. Otherwise, if the state is anything else, then the process proceeds to 102-2b-12 to reject the 10. At 102-2b-14, the process ends.

Figure 10:
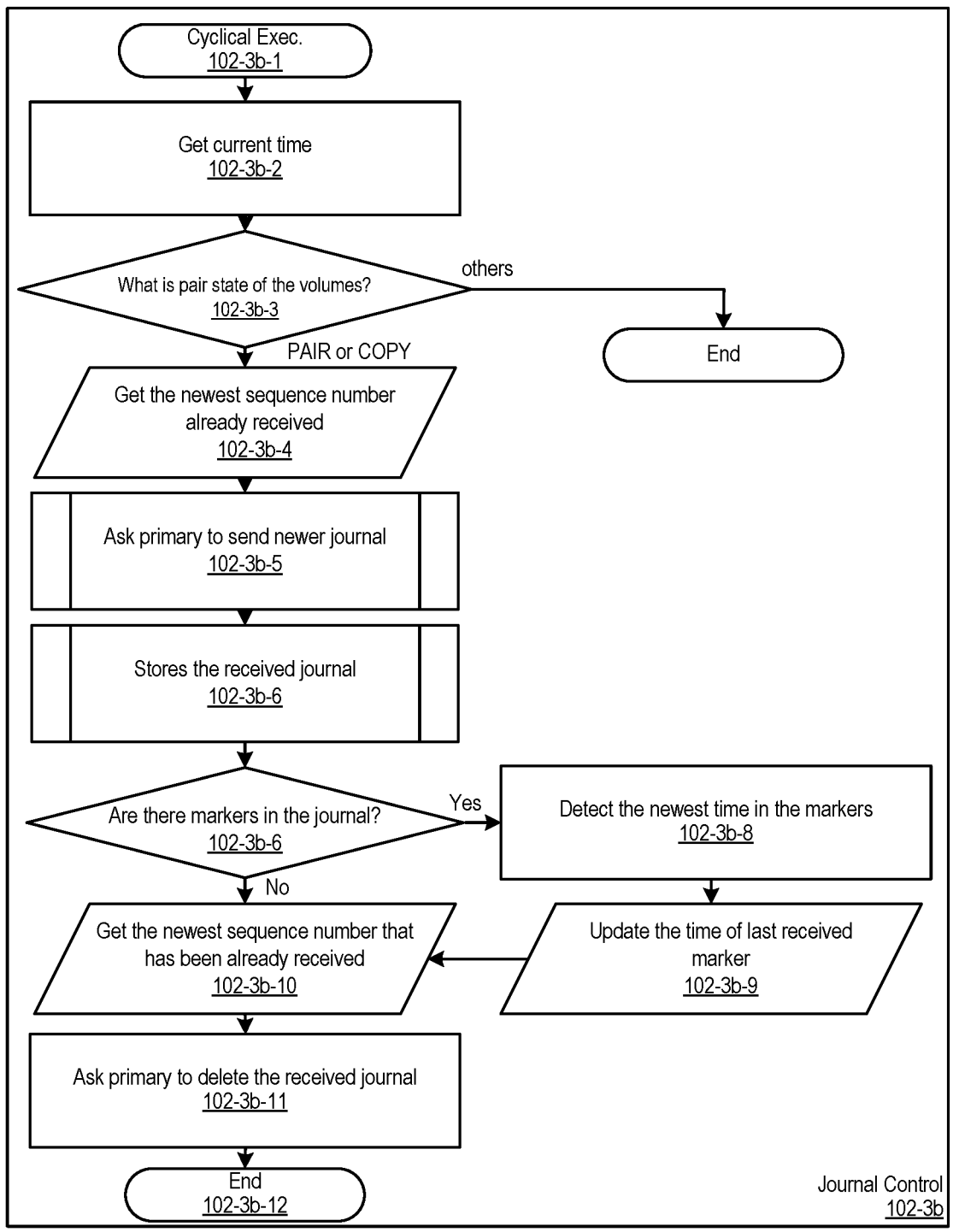
FIGS. 10 and 11 illustrate example flow diagrams of Journal Control for a journal volume of primary volumes, in accordance with an example implementation.
Figure 11:
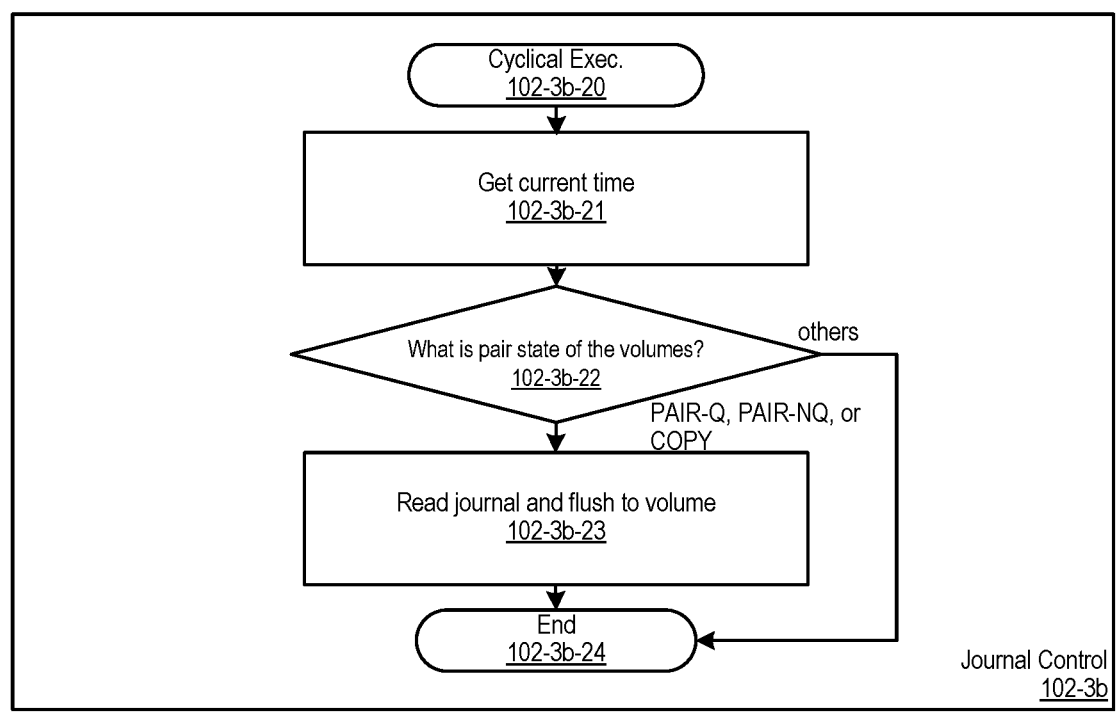

FIGS. 10 and 11 illustrate example flow diagrams of Journal Control 102-3b for a journal volume of primary volumes, in accordance with an example implementation. Step 102-3b-1 starts cyclically (for example, every second). The cycle is shorter than the cycle of Step 102-4a-10. The program requires a continuation of the previous acquisition to a paired storage device by sending a newest journal ID. After receiving ID list and journal data, the program stores the journal data to the own journal volume and requests deletion while sending the ID list. When receiving markers in the journal data, the program checks for the newest time in the markers. At 102-3b-2, the process obtains the current time. At 102-3b-3, the process determines the pair state of the volumes. If the state is not PAIR or COPY, then the process ends, otherwise, the process proceeds to 102-3b-4 to get the newest sequence number that has already been received. At 102-3b-5, the process requests the primary volume to send newer journals, if available. At 102-3b-6, the process stores the received newer journals, if any are available.

At 102-3b-6, a determination is made as to whether there are markers in the journal. If so (Yes), then the process proceeds to detect the newest time in the markers at 102-3b-8 and update the time of the last received marker at 102-3b-9. Otherwise (No), the process proceeds to get the newest sequence number that has been received at 102-3b-10. At 102-3b-11, the process requests the primary volume to delete the received journal. At 102-3b-12, the process ends.

Step 102-3b-20 also starts cyclically at a longer cycle than step 102-3b-1. The program reads journal data and flash to secondary volumes. The program deletes the journal data from the journal volume. At 102-3b-21, the process obtains the current time. At 102-3b-22, the process determines the current pair state of the volumes. If the pair state is PAIR-Q, PAIR-NQ, or COPY, then the process proceeds to 102-3b-23 to read the journal and flush to volume. Otherwise, if the pair state is anything else, then the process ends at 102-3b-24.

Figure 12:
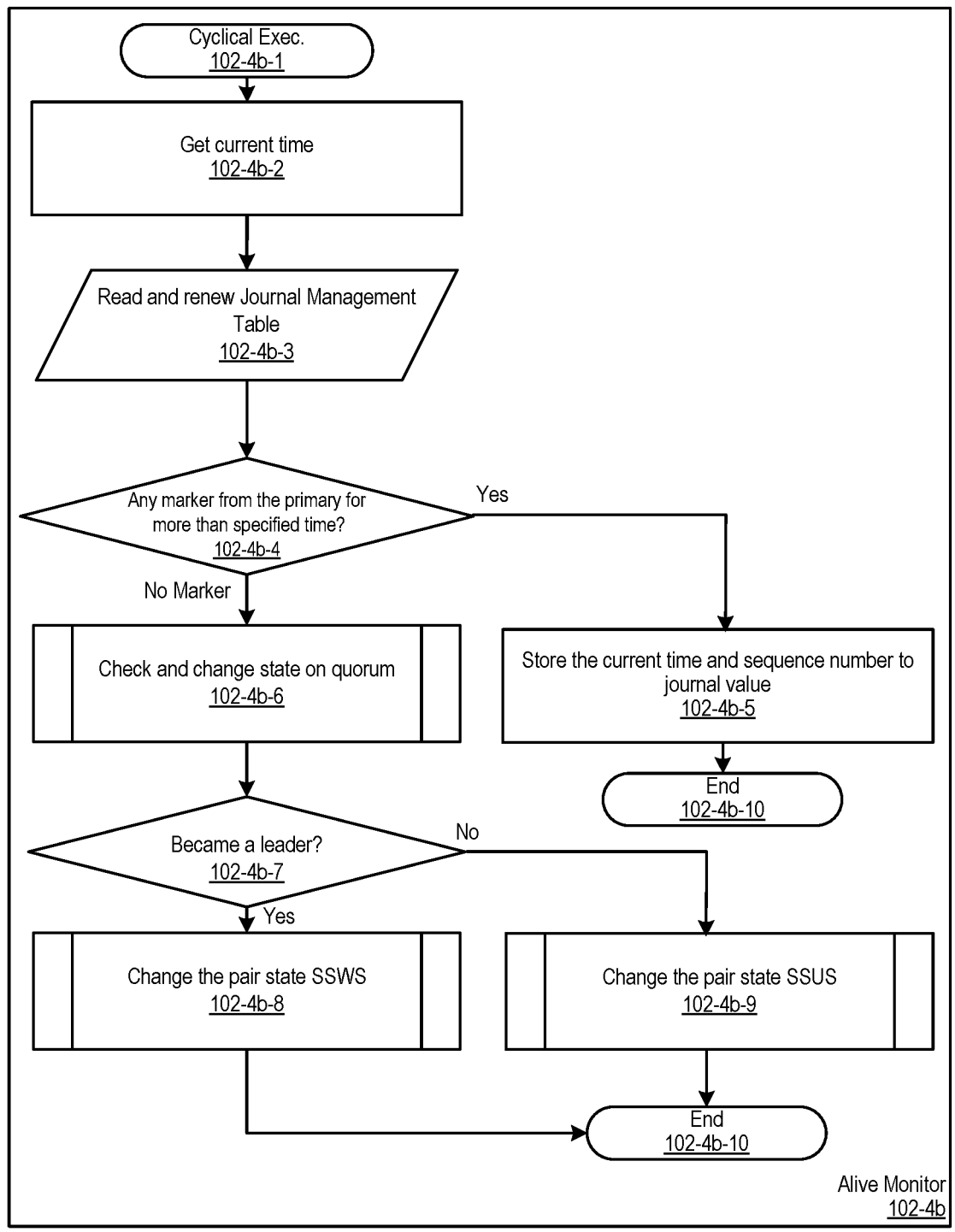
FIG. 12 illustrates an example flow diagram of Alive Monitor for a storage device of primary volumes, in accordance with an example implementation.

FIG. 12 illustrates an example flow diagram of Alive Monitor 102-4b for a storage device of primary volumes, in accordance with an example implementation. Step 102-4b-1 starts cyclically (for example, every second). The cycle is longer than the cycle of Step 102-4a-1. The program checks the reachability from or to the paired storage by using the time of the last transferred marker. If the reachability is lost, it tries to get a leader with a quorum device.

At 102-4b-2, the process obtains the current time. At 102-4b-3, the process reads and renews the Journal Management Table. At 102-4b-4, the process determines whether any marker from the primary volume has been there for more than the specified time. If there is such a marker, then the process proceeds to 102-4b-5 to store the current time and sequence number to the journal value and then end the process at 102-4b-10. Otherwise, the process proceeds to 102-4b-6 to check and change the state on the quorum.

At 102-4b-7, the process determines if the storage device for the pair has become a leader. If so (Yes), the process proceeds to 102-4b-8 to change the pair state to SSWS, otherwise (No), the process proceeds to 102-4b-9 to change the pair state to SSUS. At 102-4b-10, the process ends.

Figure 13:
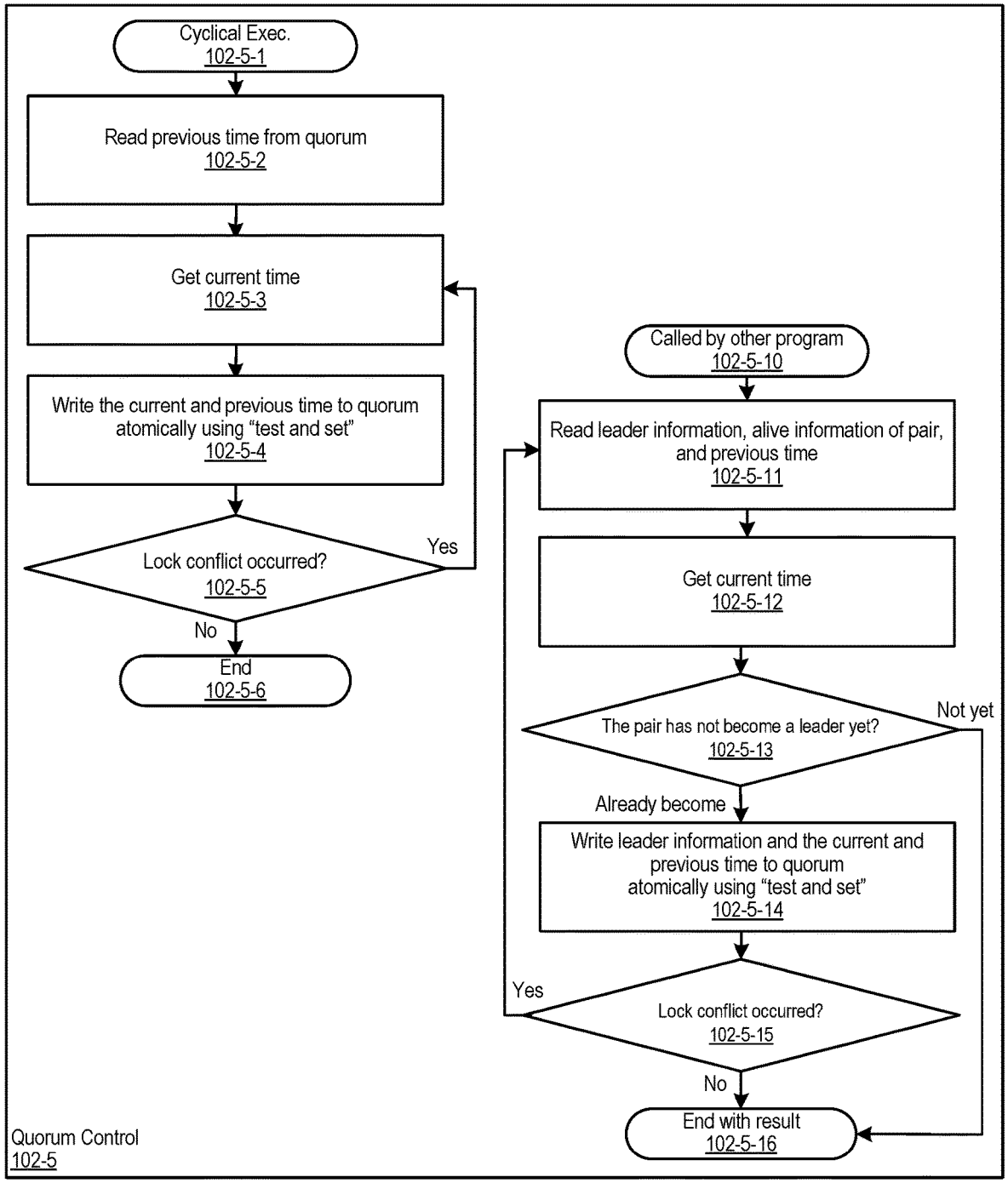
FIG. 13 illustrates an example flow diagram of the processes of Quorum Control, in accordance with an example implementation.

FIG. 13 illustrates an example flow diagram of the processes of Quorum Control 102-5, in accordance with an example implementation. Step 102-5-1 starts cyclically (for example, every second). The program stores alive information including the current time to a quorum device. At 102-5-2, the process reads the previous time from the quorum. At 102-5-3, the process obtains the current time. At 102-5-4, the process writes the current and previous time to quorum atomically using "test and set". At 102-5-5, the process determines as to whether a lock conflict has occurred. If so (Yes), then the process proceeds back to 102-5-3, otherwise (No), then the process ends at 102-5-6.

Step 102-2-5-10 starts when the other programs such as Alive Monitor 102-4a and 102-4b invoke the process. The program tries to set leader information for the storage device if it gets locked on a quorum device. At 102-5-11, the process reads leader information, alive information of the pair, and the previous time. At 102-5-12, the process obtains the current time. At 102-5-13, the process determines as to whether the pair has become the leader or not. If the pair is the leader, then the process proceeds to 102-5-14 to write the leader information and the current and previous time to the quorum, otherwise the process proceeds to 102-5-16 to end the process with the result. At 102-5-15, the process determines whether a lock conflict has occurred. If so (Yes), then the process proceeds back to 102-5-11, otherwise (No), the process ends with the result at 102-5-16.

FIG. 14 illustrates example parameters and their conditional expression of each cyclic time, in accordance with an example implementation. If the remote copy feature need to assure RTO and/or RPO, these parameters should be satisfied for the conditions as illustrated.

Formula F101 is the parameter is cyclic time used on Step 102-4a-1. Formula F102 is the parameter for the cyclic time used on Step 102-4b-1. Formula F103 is the parameter for the cyclic time used on Step 102-5-1. Formula F104 is the condition which indicates that the primary is prior to the secondary to get a leader when the network between them occurs. Formula F105 is the formula for RTO indicating that when failure occurs on a primary storage device depends on F102 and F103. Formula F106 is the formula for RPO indicating when failure occurs on a primary storage device depends on F102 and F103, as F101 is equal or less than F102 according to F104.

Figure 15:
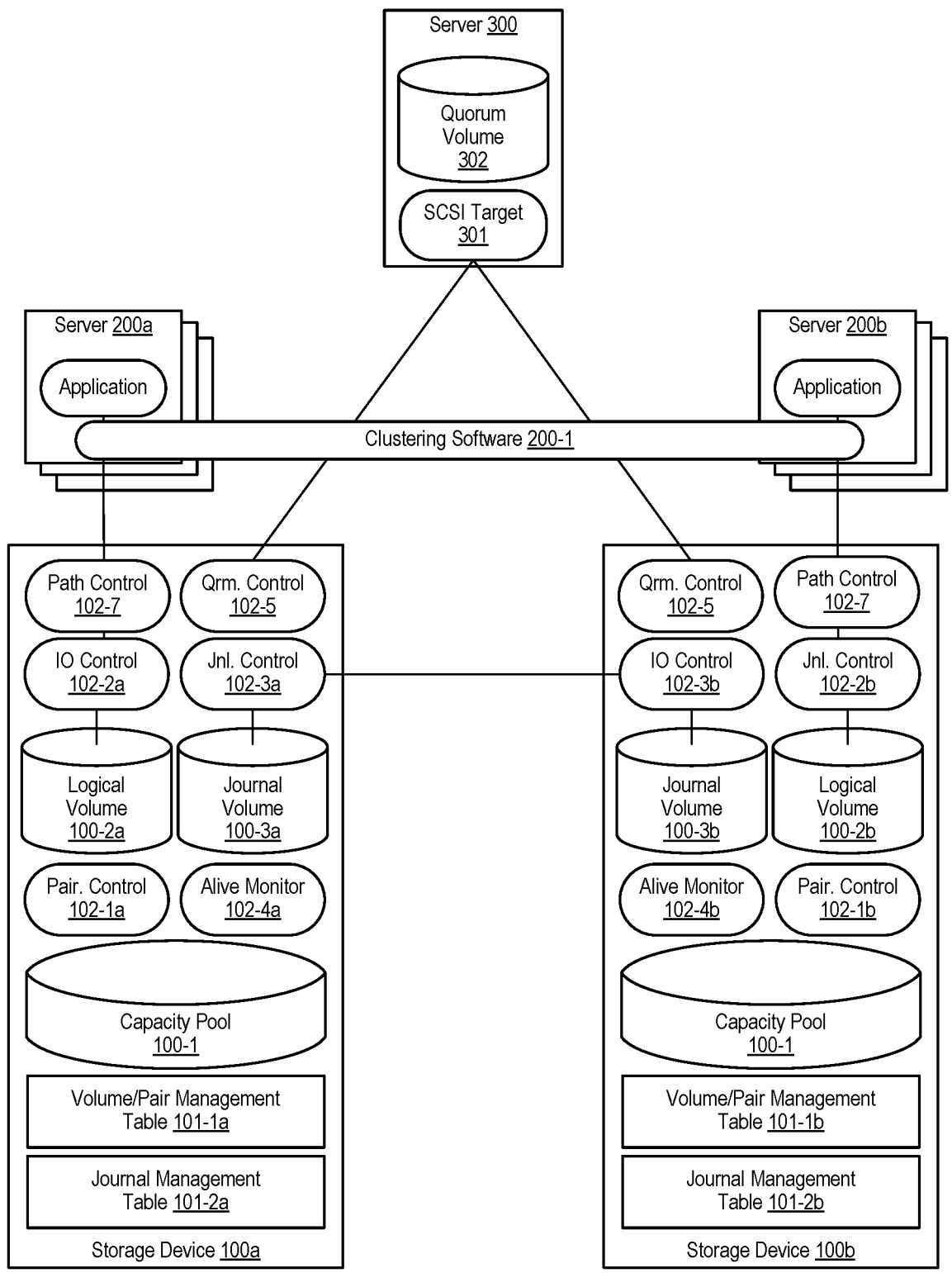
FIG. 15 illustrates another example implementation for the logical configuration based physical configuration for FIG. 1 and FIG. 2.

FIG. 15 illustrates another example implementation for the logical configuration based physical configuration for FIG. 1 and FIG. 2. The differences from FIG. 2 are below.

Path Control 102-7 controls access control and ID virtualization for Logical Volume 100-2a and 100-2b. Clustering Software 200-1 works on Server 200a and 200b, and is configured to take/fail over between both servers when takeover or fail over of server, storage-server network, or storage devices occur. Clustering Software 200-1 has a configuration to connect to the same volume from both servers.

Figure 16:
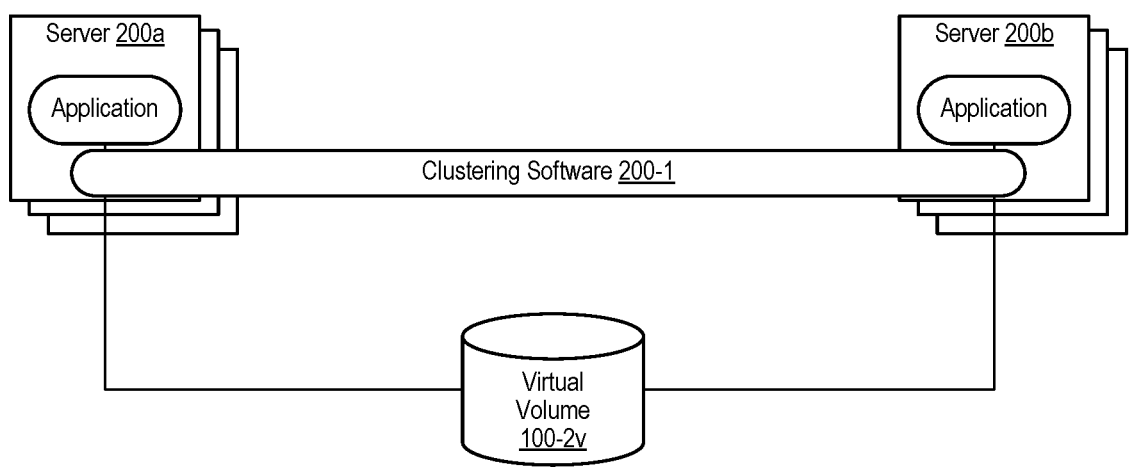
FIG. 16 illustrates an example virtual configuration of volumes that servers recognize, in accordance with an example implementation.

FIG. 16 illustrates an example virtual configuration of volumes that servers recognize, in accordance with an example implementation. By the virtualization control by Path Control 102-7, the servers recognize that they access the same volume 100-2v despite being different physically.

Figure 17:
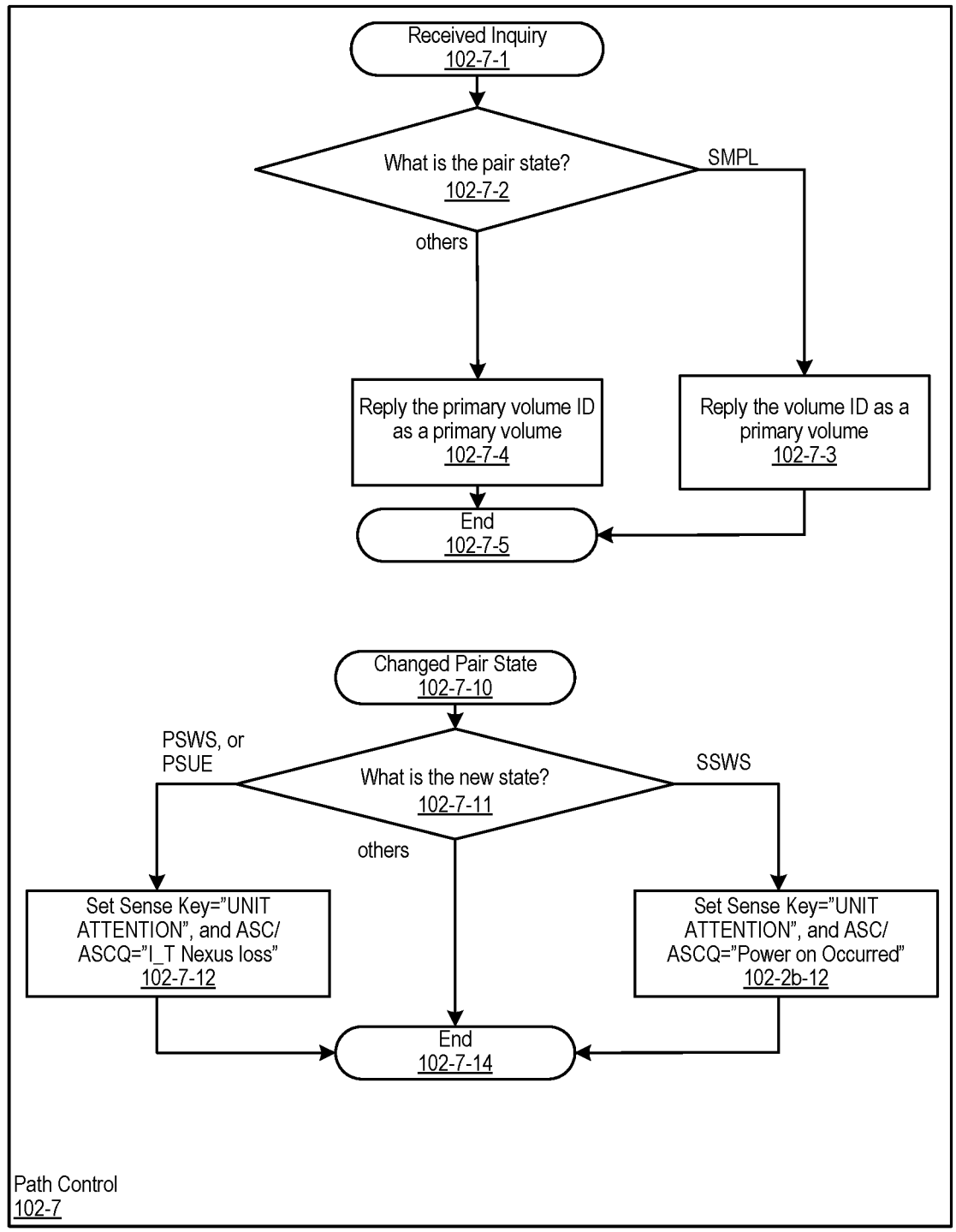
FIG. 17 illustrates example processes for Path Control, in accordance with an example implementation.

FIG. 17 illustrates example processes for Path Control 102-7, in accordance with an example implementation. Step 102-7-1 starts when the storage device receives an inquiry command and replies with the configuration and state information of the volume from servers. If the volume has a pair, the storage device replies with the ID of the primary volume even if the volume is a secondary volume. At 102-7-2, the process determines the pair state. If the pair state is SMPL, then the process proceeds to 102-7-3 to reply with the volume ID as the primary volume. Otherwise, if the pair state is not SMPL, then the process proceeds to 102-7-4 to reply with the primary volume ID as a primary volume. At 102-7-5, the process ends.

Step 102-7-10 also starts when the state of a volume change. If the volume is the secondary and that pair is suspended, it prepares to notify the loss of path. If the volume is the primary and that pair is failed over, it prepares to notify reboot of the volume. At 102-7-11, the process determines the new state. If the new state is SSWS, then the process proceeds to 102-2b-12 to set Sense Key="UNIT ATTENTION", and ASC/ASCQ="Power on Occurred". Otherwise, if the state is PSWS or PSUE, then the process proceeds to 102-7-12 to set Sense Key="UNIT ATTENTION", and ASC/ASCQ="I_T Nexus loss". Otherwise, if the process is anything else, the process ends at 102-7-14.

Figure 18:
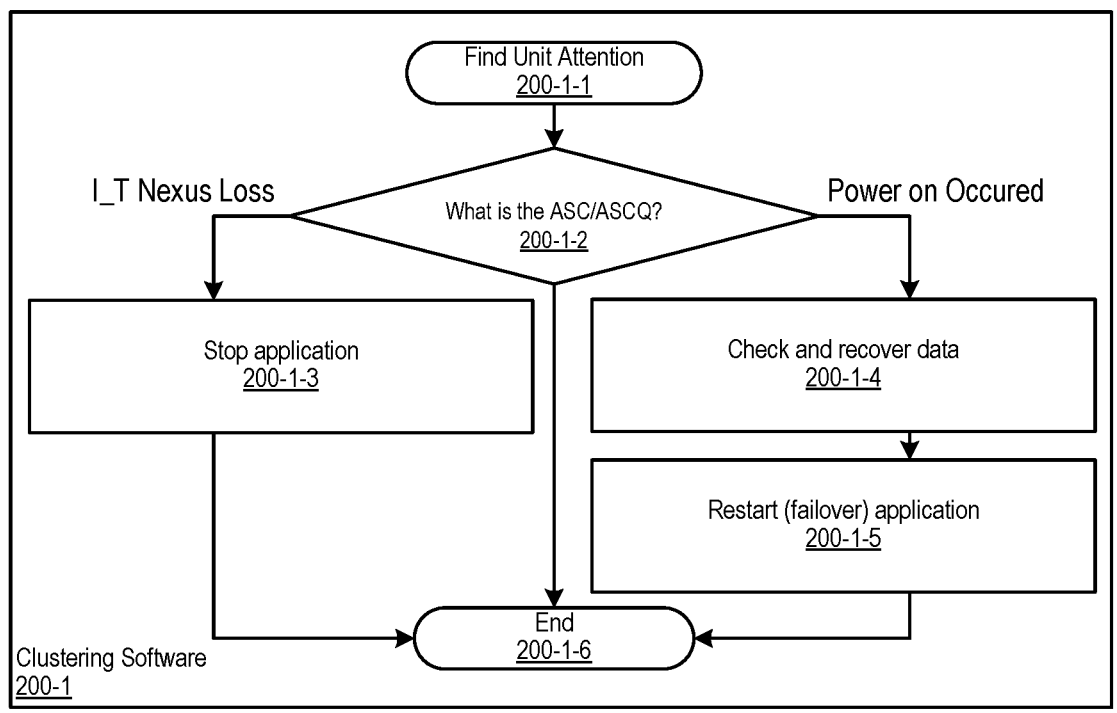
FIG. 18 illustrates example processes for Clustering Software, in accordance with an example implementation.

FIG. 18 illustrates example processes for Clustering Software 200-1, in accordance with an example implementation. Step 200-1-1 starts when SCSI UNIT ATTENTION is found. If the path an application is using is lost, the software fails over the application to another server. If the volume has a pair, the storage device replies with the ID of the primary volume even if the volume is a secondary volume.

At 200-1-2, the process determines the ASC/ASCQ from FIG. 17. If the ASC/ASCQ is "I_T Nexus loss" then the process proceeds to 200-1-3 to stop the application. Otherwise, the ASC/ASCQ is "Power on Occurred", then the process proceeds to 200-1-4 to check and recover data, and then conducts a restart (failover) application of the application at 200-1-5. At 200-1-6, the process ends.

Example implementations are utilized for high available system which requires low RPO/RTO. In related art implementations, the user requires a failover operation when the primary site is down due to disaster, which can cause a long term down time in business. By the example implementations described herein, the system can recover agilely and automatically (without human error), while assuring RTO/RPO.

As described herein, example implementations involve systems, methods, and computer programs for managing an asynchronous copy pair between a first storage system managing a primary volume and a second storage system managing a secondary volume, the primary volume and the secondary volume configured to be an asynchronous copy pair configured to manage copy operations through a primary journal and a secondary journal, which can involve storing, at the first storage system, a marker indicative of a current time to the primary journal; determining, at the first storage system, if no access has occurred from the second storage system to the primary journal for a first threshold period of time (e.g., by measuring the elapsed time based on the current time indicated by the marker); for the determining at the first storage system indicative of no access from the second storage system for more than the first threshold period of time, suspending the time operations between the primary volume and the secondary volume; determining, at the second storage system, if no marker is provided to the secondary journal for a second threshold period of time; for the determining at the second storage system indicative of no marker being provided for more than the second threshold period of time, suspending copy operations for the asynchronous copy pair as illustrated, for example, in FIGS. 1-5.

Example implementations can further involve managing a state for the asynchronous copy pair, involving for a storage device of the primary volume becoming unreachable, changing the state of the asynchronous copy pair to a first state of accepting I/O to the primary volume and duplication being unavailable as illustrated by PSUS 102-1a-5; during the first state, for the storage device of the primary volume failing to obtain a leader from a quorum device, changing the state of the asynchronous copy pair to no longer accept I/O to the primary volume as illustrated by PSWS 102-1a-6; for another storage device of the secondary volume becoming unreachable, changing the state of the asynchronous copy pair to a second state of not accepting I/O to the secondary volume and duplication being unavailable as illustrated by SSUS 102-1b-5; and during the second state, for the another storage device of the secondary volume becoming the leader from the quorum device, changing the state of the asynchronous copy pair to accept I/O to the secondary volume as illustrated by SSWS 102-1b-6.

Depending on the desired implementation, the example implementations can be executed at time cycles determined based on a recovery time objective or a recovery point objective as illustrated in FIG. 14.

As illustrated in FIG. 3, the first storage system and the second storage system can be communicatively coupled to a quorum volume managing leader information for the primary volume, and a previous access time to the quorum volume by each of the primary volume and the secondary volume; wherein the determining, at the first storage system, if no access has occurred from the second storage system to the primary journal for the first threshold period of time is based on the previous access time to the quorum volume by the secondary volume.

As illustrated in FIG. 15 and FIG. 18, for an occurrence of a path failure to an application, example implementations can involve, for a state of the asynchronously copy pair indicative of the asynchronous copy pair not accepting Input/Output (I/O), stopping the application; and for a state of the asynchronously copy pair indicative of the secondary volume being a leader and is accepting the I/O, conducting a failover to the secondary volume.

As illustrated in FIG. 16 and FIG. 17, example implementations can involve, for receipt of an inquiry for configuration information, for a state of the asynchronous copy pair indicative of the asynchronous copy pair being already established, responding to the inquiry with a volume ID of the primary volume; and for a state of the asynchronous copy pair indicative of the asynchronous copy pair undergoing a process to be established, responding to the inquiry with the volume ID of one of the primary volume and the secondary volume indicated as a leader.

As illustrated in FIG. 3 to FIG. 5, example implementations can also involve suspending Input/Output (I/O) from a host to the primary volume during the storing of the marker.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for managing an asynchronous copy pair between a first storage system managing a primary volume and a second storage system managing a secondary volume, the primary volume and the secondary volume configured to be the asynchronous copy pair configured to manage copy operations through a primary journal and a secondary journal, the method comprising:

storing, at the first storage system, a marker indicative of a current time to the primary journal;

determining, at the first storage system, if no access has occurred from the second storage system to the primary journal for a first threshold period of time;

for the determining at the first storage system indicative of no access from the second storage system for more than the first threshold period of time, suspending time operations between the primary volume and the secondary volume;

determining, at the second storage system, if no marker is provided to the secondary journal for a second threshold period of time;

for the determining at the second storage system indicative of no marker being provided for more than the second threshold period of time, suspending copy operations for the asynchronous copy pair.

2. The method of claim 1, further comprising managing a state for the asynchronous copy pair, comprising:

for a storage device of the primary volume becoming unreachable, changing the state of the asynchronous copy pair to a first state of accepting I/O to the primary volume and duplication being unavailable;

during the first state, for the storage device of the primary volume failing to obtain a leader from a quorum device, changing the state of the asynchronous copy pair to no longer accept I/O to the primary volume;

for another storage device of the secondary volume becoming unreachable, changing the state of the asynchronous copy pair to a second state of not accepting I/O to the secondary volume and duplication being unavailable; and during the second state, for the another storage device of the secondary volume becoming the leader from the quorum device, changing the state of the asynchronous copy pair to accept I/O to the secondary volume.

3. The method of claim 1, wherein the method is executed at time cycles determined based on a recovery time objective or a recovery point objective.

4. The method of claim 1, wherein the first storage system and the second storage system is communicatively coupled to a quorum volume managing leader information for the primary volume, and a previous access time to the quorum volume by each of the primary volume and the secondary volume;

wherein the determining, at the first storage system, if no access has occurred from the second storage system to the primary journal for the first threshold period of time is based on the previous access time to the quorum volume by the secondary volume.

5. The method of claim 1, further comprising, for an occurrence of a path failure to an application:

for a state of the asynchronously copy pair indicative of the asynchronous copy pair not accepting Input/Output (I/O), stopping the application;

for a state of the asynchronous copy pair indicative of the secondary volume being a leader and is accepting the I/O, conducting a failover to the secondary volume.

6. The method of claim 1, further comprising, for receipt of an inquiry for configuration information:

for a state of the asynchronous copy pair indicative of the asynchronous copy pair being already established, responding to the inquiry with a volume ID of the primary volume; and for a state of the asynchronous copy pair indicative of the asynchronous copy pair undergoing a process to be established, responding to the inquiry with the volume ID of one of the primary volume and the secondary volume indicated as a leader.

7. The method of claim 1, further comprising suspending Input/Output (I/O) from a host to the primary volume during the storing of the marker.

8. A non-transitory computer readable medium, storing instructions for managing an asynchronous copy pair between a first storage system managing a primary volume and a second storage system managing a secondary volume, the primary volume and the secondary volume configured to be the asynchronous copy pair configured to manage copy operations through a primary journal and a secondary journal, the instructions comprising:

storing, at the first storage system, a marker indicative of a current time to the primary journal;

determining, at the first storage system, if no access has occurred from the second storage system to the primary journal for a first threshold period of time;

for the determining at the first storage system indicative of no access from the second storage system for more than the first threshold period of time, suspending time operations between the primary volume and the secondary volume;

determining, at the second storage system, if no marker is provided to the secondary journal for a second threshold period of time;

for the determining at the second storage system indicative of no marker being provided for more than the second threshold period of time, suspending copy operations for the asynchronous copy pair.

9. The non-transitory computer readable medium of claim 8, the instructions further comprising managing a state for the asynchronous copy pair, comprising:

for a storage device of the primary volume becoming unreachable, changing the state of the asynchronous copy pair to a first state of accepting I/O to the primary volume and duplication being unavailable;

during the first state, for the storage device of the primary volume failing to obtain a leader from a quorum device, changing the state of the asynchronous copy pair to no longer accept I/O to the primary volume;

for another storage device of the secondary volume becoming unreachable, changing the state of the asynchronous copy pair to a second state of not accepting I/O to the secondary volume and duplication being unavailable; and during the second state, for the another storage device of the secondary volume becoming the leader from the quorum device, changing the state of the asynchronous copy pair to accept I/O to the secondary volume.

10. The non-transitory computer readable medium of claim 8, wherein the instructions are executed at time cycles determined based on a recovery time objective or a recovery point objective.

11. The non-transitory computer readable medium of claim 8, wherein the first storage system and the second storage system is communicatively coupled to a quorum volume managing leader information for the primary volume, and a previous access time to the quorum volume by each of the primary volume and the secondary volume;

wherein the determining, at the first storage system, if no access has occurred from the second storage system to the primary journal for the first threshold period of time is based on the previous access time to the quorum volume by the secondary volume.

12. The non-transitory computer readable medium of claim 8, further comprising, for an occurrence of a path failure to an application:
   for a state of the asynchronously copy pair indicative of the asynchronous copy pair not accepting Input/Output (I/O), stopping the application;
   for a state of the as the asynchronous copy pair indicative of the secondary volume being a leader and is accepting the I/O, conducting a failover to the secondary volume.

13. The non-transitory computer readable medium of claim 8, further comprising, for receipt of an inquiry for configuration information:
   for a state of the asynchronous copy pair indicative of the asynchronous copy pair being already established, responding to the inquiry with a volume ID of the primary volume; and
   for a state of the asynchronous copy pair indicative of the asynchronous copy pair undergoing a process to be established, responding to the inquiry with the volume ID of one of the primary volume and the secondary volume indicated as a leader.

14. The non-transitory computer readable medium of claim 8, further comprising suspending Input/Output (I/O) from a host to the primary volume during the storing of the marker.

\* \* \* \* \*